United States Patent Office 3,624,891
Patented Dec. 7, 1971

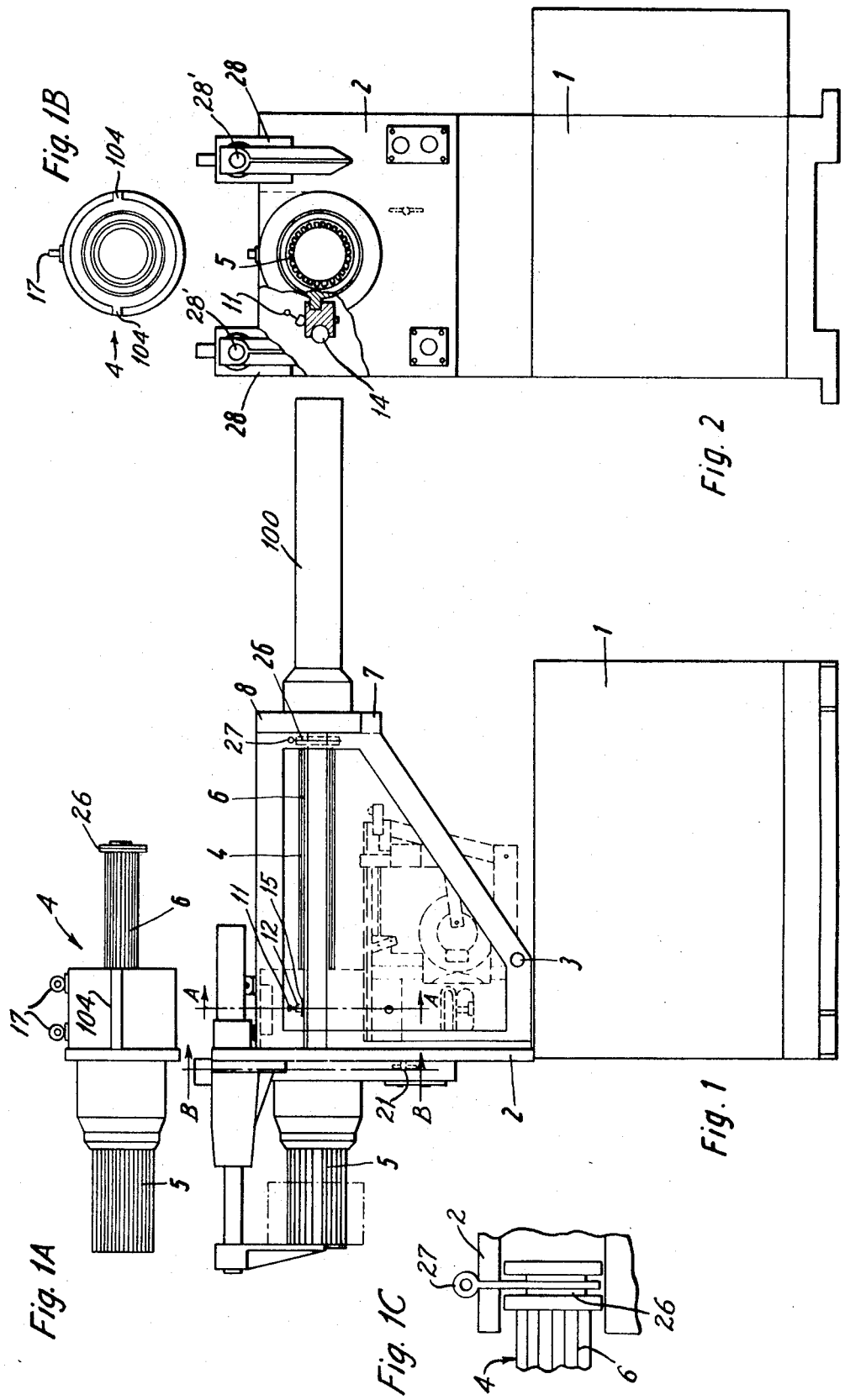

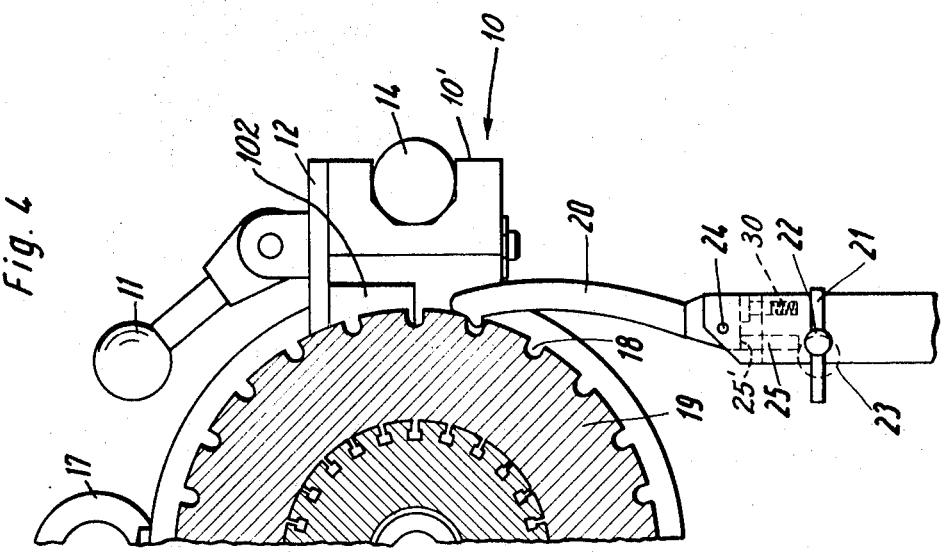
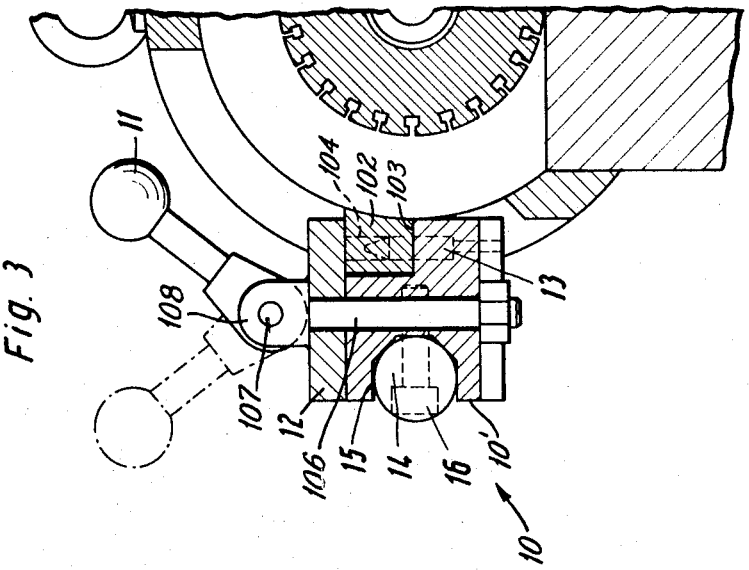

---

3,624,891
MACHINE FOR INSERTING WINDINGS INTO
STATORS OF ELECTRIC MOTORS
Hans Droll, Bergen-Enkheim, Germany, assignor to Balzer
 & Droll KG., Niederdorfelden an der Rosenhelle, Germany
Filed June 23, 1969, Ser. No. 835,704
Claims priority, application Germany, July 9, 1968,
P 17 63 641.8
Int. Cl. H02k *15/04*
U.S. Cl. 29—205 R                                    8 Claims

ABSTRACT OF THE DISCLOSURE

A machine for inserting windings into stators of electric motors and like machines which is provided with an insertion tool for the windings so arranged as to be held in its operative position in the machine frame by means of readily releasable quick-acting locking means disposed one on each side of the inserting tool and adapted on release to allow the tool to be lifted bodily out of the machine frame. The tool may be provided with lifting lugs adapted to receive the load hook of a crane. Locking means for the rear end, which may be telescopically formed with respect to the front end, may also be provided. If the tool, as is known, is provided with a rotatable ratchet disc held in position by a pawl engaging one or other of its teeth, means are provided for moving the pawl out of its engaged position.

---

This invention relates to a machine for inserting windings into stators of electric motors or other electric machines.

DESCRIPTION OF THE PRIOR ART AND SUMMARY OF THE INVENTION

In semi-automatic machines for inserting the windings into stators of electric motors it is essential to reduce the extent of standstill times, such as for re-tooling the machine with another inserting tool.

The primary object of the invention is to construct a machine of this kind wherein the inserting tool can be removed in its entirety by simple means and quickly from the machine frame and then replaced by another inserting tool. According to the invention the sleeve of the inserting tool is retained in the frame by a pair of quick-action locking devices of known construction and after their release may be removed with the entire tool upwardly from the frame.

Preferably, the inserting tool is telescopic to about half its working length and may be locked in the operating position by means of a withdrawable insert key. Preferably the head of the inserting tool is also provided with two mounting lugs to receive a crane hook. In addition the head of the inserting tool may have a toothed ratchet plate in which a pawl engages under the action of a spring. The pawl is associated with a manually adjustable lever at the front of the upper part of the machine, rotation of which withdraws the pawl from the teeth and releases the head of the inserting tool for lifting.

BRIEF DESCRIPTION OF THE DRAWINGS

The invention will in the following be further described by way of example with reference to an embodiment shown in the drawings in which:

FIG. 1 is a side elevation of the machine showing the insertion tool inserted therein;

FIG. 1A is a side elevation of the insertion tool, removed from the machine, and FIG. 1B is a front elevation of FIG. 1A, viewed from the left end thereof.

FIG. 1C is an enlarged view of a portion of FIG. 1.

FIG. 2 is a partially broken away front elevational showing the insertion tool mounted therein;

FIG. 3 is an enlarged partial cross-sectional view showing the lefthand side of the apparatus viewed along the plane of line A—A of FIG. 1.

FIG. 4 is an enlarged partial cross-sectional view of the righthand side of the apparatus viewed in a plane taken along the line B—B of FIG. 1.

DETAILED DESCRIPTION OF THE DRAWINGS

The machine to which the invention is applied comprises a lower frame 1 and an upper frame 2 mounted on the frame 1 to pivot about a pivot pin 3. The upper part 2 receives an inserting tool 4 having an insertion head 5 and a rear member 6 as well as the mechanical operating and switching unit. The drawings show the upper part 2 in its extreme tilted position, that is, tilted forwardly about the pivot axis 3. The mechanical operating and switching units referred to above are shown in dotted lines in FIG. 1 and the cylinder 100 which drives the tool 4 in reciprocation during its operation is also shown in the FIG. 1.

The above described construction of such machines forms no part of the invention.

In the construction according to the invention the head 5 of the inserting tool is provided on each side of a vertical plane with oppositely mounted quick-action locking devices 10. Each quick-action locking device 10 comprises a shiftable eccentric lever 11, co-operating with a clamping plate 12 and an adjusting pin mechanism 13. The main parts 10' of the locking devices are secured by screws 16 to two continuous shafts 14 carried in the machine by means of bearings 15.

As is clear from the left side of FIG. 3, the part 102 of the tool 4 is held against upward movement. This part 102 is seated on a ledge 103 of the main part 10' of the clamp 10 and positioned on this ledge 103 by locating its bores 104 onto adjusting pins 13. Clearly then, if one simply removes the clamping plate 12 from the area just above part 102, part 102 and hence the tool 4 can be removed vertically relative to the clamps 10. Any convenient means may be used to remove plate.

As shown in the present case, the eccentric lever 11 is pivotally connected at pin 107 to ears 108, such that turning the lever 11 about a vertical axis through bolt 106 turns the plate 12 about said vertical axis. Comparing the element 12 in FIGS. 1 and 3, it can be seen that its dimension in the direction parallel to the tool (see FIG. 1) is less than its dimension in the direction transverse to the tool axis (see FIG. 3), i.e., it is elongated, the longer dimension being visible in FIG. 3. Thus, when this plate 12 is rotated 90°, it will no longer lie above part 102 and hence, tool 104 can be removed vertically. The said eccentricity of lever 11 is utilized such that in the solid line position of FIG. 3, the lever 11 is held firmly against plate 12, clamping it in place, whereas, in the dotted line position, lever 11 and plate 12 are loose, permitting said turning movement.

For actually lifting the tool, the head 5 has two lifting lugs 17 adapted to receive a crane hook. In addition the head in known manner also contains a rotatable ratchet disc 19 having teeth 18 which engage a pawl 20 which is loaded by spring 30 to turn about pivot axis 24 and hence engage disc 19. The pawl 20 is vertically reciprocable in the upper part 2 of the machine and has a bar 21 passing through its front wall. An eccentric disc 23 is firmly connected with a pivot 22 of the bar 21 and on turning the bar 21 into the vertical position the disc swings upwardly, thereby pushing the rod 25, which abuts pawl 20 at 25' turning the pawl 20 clockwise about pivot axis 24 and hence lifting the pawl 20 out of the ratchet 19. Thus, in this position of the bar 21, the pawl 20 no longer obstructs the lifting of the insertion tool. In order to further facilitate the lifting of the insertion tool 4 the same may be shortened by telescoping in the rear end, effecting simultaneously a concentration of the weight when engaged by the lifting crane. Note the shortened length of the tool in FIG. 1A as compared with FIG. 1.

The pawl 20 is rotatable about the pivot 22 and on twisting the eccentric 23 into the upper position, the eccentric 23 presses against a stud 25 causing the pawl 20 to be swung to the right.

As shown in FIG. 1C, the rear end of the insertion tool has also an annular groove 26 adapted to receive a forked key 27 to secure said end.

The upper part 2 of the machine has on its upper side two pivoting arms 28 adapted to be swung towards each other about rods 28' from the position shown in the drawing so that their lower ends engage in front of the stator pushed over the inserting tool and secure the same in this position.

I claim:

1. A machine for inserting windings into stators of electric motors and like machines comprising: a machine frame, a winding insertion tool mounted in an upper part of said frame, said tool being elongated, said machine being open at its top to permit the entire winding insertion tool to be inserted into and lifted out of the machine vertically in a direction generally perpendicular to the longitudinal axis of the tool, a locking device mounted in the machine on each side of the tool, each said device selectively holding the tool against upward movement, and each device including a quick release means for relatively quickly releasing the tool from the locking device to permit upward movement of the tool from the machine.

2. A machine according to claim 1, wherein said machine includes a pair of shafts fixed therein and extending generally parallel to the longitudinal axis of the tool, one on each side of the tool, and said locking devices being mounted, one on each of said shafts.

3. A machine according to claim 2, each said locking device comprising a main part connected to one of said shafts, a ledge on the main part, a member removably mounted on said ledge such that it projects outwardly above a portion of the tool to permit upward movement of said portion of the tool, a quick acting means movable in a single motion to either (a) cover said member to prevent upward movement thereof, or (b) uncover said member to permit upward removal thereof.

4. A machine as claimed in claim 1 wherein the insertion tool is additionally held in the machine at its rear end by a withdrawable push-in pin.

5. A machine as claimed in claim 1 which includes a rotatable ratchet disc on said insertion tool, a pawl engaging said ratchet disc to hold said disc and means to move said pawl out of its engaged position.

6. A machine according to claim 5, said pawl being spring biased into engagement with the disc, and wherein said means to move the pawl includes an eccentric means accessible from outside the machine for turning the pawl about an axis in opposition to the spring to move the pawl to its disengaged position.

7. A machine as claimed in claim 1 wherein the rear section of said insertion tool is constructed so as to be in telescopic relation with the remainder of said tool.

8. A machine as claimed in claim 1 wherein said insertion tool is provided adjacent its front end with two mounting lugs shaped to receive a load hook of a crane.

References Cited
UNITED STATES PATENTS

| 2,836,204 | 5/1958 | Mason | 29—205 X |
| 3,324,536 | 6/1967 | Hill | 29—205 |
| 3,447,225 | 6/1969 | Eminger | 29—205 |

GRANVILLE Y. CUSTER, JR., Primary Examiner